United States Patent Office 3,282,813
Patented Nov. 1, 1966

3,282,813
METHOD OF RECLAIMING USED LUBRICANTS BY SUBJECTING TO ELECTRICAL FIELD IN PRESENCE OF NON-ASH POLYMERIC DISPERSANTS
Charles H. Bailey, Berkeley, Calif., assignor to Shell Oil Company, New York, N.Y., a corporation of Delaware
No Drawing. Filed Jan. 30, 1963, Ser. No. 255,081
3 Claims. (Cl. 204—184)

This invention relates to reclaiming used lubricating oil compositions containing basic nitrogen-containing polymeric dispersants. More particularly, the present invention relates to removal of sludge and contaminates formed in non-ash dispersant lubricants during use without removal of the dispersant by subjecting such lubricants to an electrical field.

It is known that various materials can be separated from solutions by applying thereto an electrical potential. Thus, in the petroleum industry electrical means have been employed to remove impurities formed during the chemical processing of oils or in separation of waxes from oils. In the case of reclaiming lubricating oils these means as well as various filtration means have been proposed. However, the shortcoming in the case of reclaiming or purifying compounded lubricating oil compositions is that regardless of the purifying means used not only are the undesirable sludges and contaminates removed but the desirable additives as well. Thus, the removal of the latter is an expensive loss which must be replaced before the reclaimed lubricant can be used again in engines for their intended purpose.

It has now been discovered that subjecting used compounded lubricants to an electrical field in the presence of a small amount of a particular class of non-ash polymeric dispersants that by such means used compounded lubricants containing large amounts of sludge and contaminates can be purified and reclaimed without loss of the dispersant polymers and other additive improvers present therein. Compounded lubricants thus reclaimed can be used for lubricating purposes as such or if desired refortified with small amounts of additive improvers such as dispersants, anti-oxidants and extreme pressure agents and the like. Compounded lubricants purified and reclaimed by the manner of this invention, add life to the lubricant and reduce costs.

The non-ash forming polymeric dispersant, the presence of which is essential in aiding reclamation of used lubricating oil composition without essential loss of additives originally present therein by the electrical means of this invention, is an oil-soluble copolymer of (1) a vinylpyridine and (2) a mixture of at least two dissimilar esters of an acrylic acid and two different aliphatic alcohols one of which is a long chain aliphatic alcohol containing at least 10 carbon atoms, and the other alcohol being a lower aliphatic alcohol of not more than 6 carbon atoms, said copolymers having the vinylpyridine and the acrylate esters in the mol ratio of from 2:1 to 1:10. A preferred copolymer is one in which the acrylates comprises a mixture of at least two dissimilar acrylates of different length chain alcohols and also an acrylate of a $C_{1-4}$ alcohol, total acrylic ester being in a mol ratio varying from 1:10 to 2:1, the acrylate of the lower aliphatic alcohol making up not more than 60 mol percent of the total ester, and the molecular weight of the copolymer varying from $5 \times 10^4$ to $2.5 \times 10^6$, as determined by the light scattering method.

The vinylpyridines used in making the special copolymers (II) are exemplified by 2-vinylpyridine, 3-vinylpyridine, 4-vinylpyridine, 2-methyl-5-vinylpyridine, 4-methyl-2-vinylpyridine, 5-ethyl-2-vinylpyridine and 2-butyl-5-vinylpyridine, and the like. Particularly preferred groups comprise 2-, 3- and 4-vinylpyridine and the lower alkyl-substituted derivatives thereof.

The long chain acrylate esters used in the preparation of the copolymers (include the ester of acrylic acid and the alpha-substituted acrylic acids such as methacrylic acid, ethacrylic acid, alpha, alpha-phenyl acrylic acid, alpha-cyclohexyl acrylic acid and chloroacrylic acid. The long chain aliphatic alcohols used in the esterification of these acids may be exemplified by decyl, lauryl, cetyl, stearyl, eicosanyl, nonadecanyl, and the like alcohols and mixture thereof. Particularly preferred esters to be used are the acrylic acid and methacrylic acid esters of aliphatic monohydric alcohols, and especially alkyl alcohols, containing from 14 to 20 carbon atoms.

Specific examples of these long chain acrylic acid esters, include, among others, decyl acrylate, lauryl acrylate, stearyl acrylate, decyl methacrylate, lauryl methacrylate, cetyl methacrylate, stearyl methacrylate, eicosanyl acrylate, docosanyl acrylate and the like, and mixtures thereof.

As noted, in addition to the short chain acrylate, one and preferably a mixture of two or more of the long chain acrylate esters is used in making the copolymers. Illustrative examples of these esters and mixtures thereof include, among others, dodecyl methacrylate/octadecyl methacrylate, tetradecyl acrylate/octadecyl methacrylate; decylmethacrylate/hexadecyl methacrylate; tetradecyl acrylate/octadecyl methacrylate; dodecyl methacrylate/ eicosanyl acrylate, and the like.

Copolymers of the present invention have molecular weights between 50,000 and 2,500,000 as determined by the light scattering technique described in Chem. Rev., vol. 40, page 319 (1948). Preferably, the molecular weights range from about 15,000 to 1,000,00 and more preferably from 1,000,000 to 650,000.

EXAMPLE I

A mixture of 2.52 mols of stearyl methacrylate, 5.04 mols of lauryl methacrylate, 0.83 mol of methyl methacrylate and 1 mol of 2-methyl-5-vinylpyridine and 0.2% wt. of alpha,alpha'-azodiisobutyronitrile dissolved in a minor amount of acetone for solubility was placed in a reaction vessel and reacted for about 24—48 hours at 65° C. with stirring in a nitrogen atmosphere. The polymer was then dispersed in volumes of benzene and thereafter precipitated with 5–10 volumes of a mixture of acetone and methanol. This was repeated and a stearyl methacrylate; lauryl methacrylate/methyl methacrylate/2-methyl-5-vinylpyridine polymer having a nitrogen content by 0.60% by weight and a molecular weight in excess of 750,000 was recovered.

Following essentially the procedure of Example I, other polymers are prepared from monomer mixtures in the mol proportions as shown in Table I.

TABLE I

| Example | SMA* | LMA | MMA | BMA | MVP | EVP |
|---------|------|-----|-----|-----|-----|-----|
| II | 2.24 | 4.48 | 1.86 | | 1 | |
| III | 2.24 | 4.48 | | 1.86 | 1 | |
| IV | 2.05 | 3.92 | 2.43 | | 1 | |
| V | 2.05 | 3.92 | | 2.43 | 1 | |
| VI | 1.68 | 3.36 | 3.36 | | 1 | |
| VII | 1.68 | 3.36 | | 3.36 | 1 | |
| VIII | 1.40 | 2.80 | 4.2 | | 1 | |
| IX | 1.40 | 2.80 | | 4.2 | 1 | |
| X | 1.12 | 2.24 | 5.04 | | 1 | |
| XI | 1.12 | 2.24 | | 5.04 | 1 | |
| XII | 2.52 | 5.04 | 0.83 | | 1 | |
| XIII | 2.24 | 4.48 | | 1.86 | | 1 |
| XIV | 2.05 | 3.92 | | | | 1 |
| XV | 2.05 | 3.92 | | 2.43 | | 1 |

*SMA=Stearyl methacrylate; LMA=lauryl methacrylate; MMA=methyl methacrylate; BMA=butyl methacrylate; MVP=2-methyl-5-vinylpyridine; EVP=5-ethyl-2-vinylpyridine.

Used compounded lubricants reclaimed by the electrical process of this invention in addition to retaining in the oil the above described copolymer also retains any additive agents which may be originally present such as small amounts (0.01%–2%) of partial or full esters of organic phosphorus compounds, phenolic anti-oxidants, thiocarbamates and the like.

Phosphorus compounds include alkyl, cycloalkyl, alkaryl, aralkyl, and aryl phosphites, phosphates, phosphonates, and their thio-derivatives, such as $C_{3-18}$ alkyl phosphites, e.g. di- and tributyl, octyl, lauryl, stearyl, cyclohexyl, benzyl, cresyl, phenyl phosphites or phosphates, as well as their thio-derivitatives; $P_2S_5$-terpene reaction product, e.g. $P_2S_5$-pine oil reaction product and metal salts thereof such as Na, K, Ca or Ba salts of $P_2S_5$-terpene reaction product; dibutyl methanephosphonate, dibutyl trichloromethanephosphonate, dibutyl monochloromethanephosphonate, dibutyl chlorobenzenephosphonate, dibutyl monochloromethanephosphonate, dibutyl chlorobenzenephosphonate, and the like. The esters of pentavalent phosphorus acids such as diphenyl, dicresyl, triphenyl, tricresyl, trilauryl and tristearyl ortho phosphates, $P_2S_5$-terpene reaction products and mixtures thereof are preferred. Of such compositions is greatly enhanced and the overall properties of such compositions substantially improved by addition thereto of a phenolic-anti-oxidant compounds is small amounts of 0.01–2% by weight, preferably 0.1–1% by weight which can be present in the original lubricating oil composition include mono or bisphenols, preferably phenols which contain at least one tertiary alkyl radical. Alkyl phenols of this type include 2,4,6-triethyl-, tributyl-, trioctyl-2,4-ditert-butyl-6-methyl-, 2,6-ditert-butyl-4-methyl-, 2,4,6-tritert-butyl-2,6-dicyclohexyl - 4 - methyl -, 2,6 - dimethyl-4-cyclohexyl-phenols, 2,6-ditert-butyl, 2,2-ditert-butyl, 2,6-tertbutylcyclohexyl, 2-methyl-6-tertbutyl-4-methphenols. The alkyl bisphenols include 1,1-bis(2-hydroxy-3-t-butyl-5-methylphenyl)methane; bis(2 - hydroxy-3-t-butyl-5-methylphenyl)ethane; 1,1-bis(2 - hydroxy-3-t-butyl-2-methylphenyl)propane; bis(2 - hydroxy-3-t-butyl-5-methylphenyl)isobutane; 1,1-bis(6 - hydroxy-5-t-butyl-3-methylphenyl)methane; bis(2-hydroxy-5-t-butyl-3-methylphenyl)ethane; 1,1-bis(2-hydroxy-5-t-butyl-3-propane; 1,1-bis(2-hydroxy-5-t-amyl-3-methylphenyl)butane; etc. Also present may be metal thiocarbamates such as polyvalent metal (Zn, Fe, Cd) dialkyl dithiocarbamates, e.g. Zn and Cd dibutyl dithiocarbamate or Zn and Cd diamyl dithiocarbamate.

Examples of compounded lubricants suitable for purification and reclaiming by being subjected to the electrical treatment of this invention can be illustrated by the following examples.

EXAMPLE A

Mineral oil containing 2% wt. of copolymer of Example I, 0.5% wt. 4,4'-methylene bis(2,6-ditert-butylphenol) and 0.8% tricresyl phosphate.

EXAMPLE B

Mineral oil containing 2% wt. of copolymer of Example I, 0.5% wt. 4,4'-methylene bis(2,6-ditert-butylphenol), 0.8% tricresyl phosphate and 0.04% dicresyl phosphate.

Lubricants such as exemplified by Examples A and B which on use become contaminated with sludge, impurities, water, oil and fuel decomposition products and the like, can be successfully reclaimed by subjecting said lubricants to a potential electrical field. The field intensity used depends upon the type of lubricant being treated and the amount of copolymer present or added thereto during the electrical treatment. The presence of more than 3–4% wt. copolymer in the used lubricant makes the purification or reclaiming process inoperative since in such cases not only are the contaminates such as sludge and the like removed, but also desirable additives as well as under such conditions the electrical process of reclaiming lubricants presents the same shortcoming as reclaiming of used oils by filtration, sedimentation or other conventional means. To be effective the copolymer must be present in controlled concentration of between 0.2% and 2.5%, preferably between 0.5% and 2% by weight.

Under the above conditions the electrical field intensity applied to used oils cans vary between 2,500 and 20,000, preferably between 5000 and 15,000 volts per centimeter, for a period of from 2–48 hours preferably 10–24 hours.

Electrical charges can be sent through the lubricant being treated for removal of impurities but not the removal of beneficial additives present therein, in the presence of the copolymer as described, by a number of suitable means. Equipment used for this purpose can be illustrated by the following examples:

Burette and plate

This is a static system consisting of a 250-ml. burette into which are inserted two, 1" x 1/8" x 15" long, steel plates that are held 1/4" apart by Teflon spacers. When the burette is filled with the oil to be cleaned or purified, a D.-C. voltage is impressed across the plates. The heavy sludge deposits form on both the positive and the negative plates.

Test stand cleaner

This electrostatic cleaner consists of a one-quart A.-C. spark plug S–6 filter modified by removing the cartridge element and replacing it with a stack of 1/4" spaced flat steel plates. Every other plate is electrically insulated and connected to a source of D.-C. potential through a high voltage bushing in the top of the case. The remaining portion of the test equipmnet is made up of a circulating pump, a reservoir, and connecting lines with a bypass and a throttle valve. To avoid electrical shock hazard, the electrostatic cleaner is mounted in a steel cage underneath the high voltage D.-C. power supply. An electrical interlock secured and grounded the high voltage source when the cage door was opened.

Engine cleaner

The engine cleaner consists of the above described electrostatic cleaner in an A.-C. spark plug case piped into the engine oil system as direct replacement for a normal engine filter.

Commercial electrical precipitators such as the "M-S-A Burks Purifier" described the Bulletin M-S-A Burks Purifier published by the Mine Safety Appliances Co. of Pittsburgh, Pa., or Cotrell Precipitators can be also used.

The present invention is illustrated by the following examples using two insulated steel plates submerged in a 250 ml. burette filled with a used lubricant to be tested and 25,000 volts D.-C. impressed between the two plates for 24 hours.

(1) A polymeric dispersant oil (Example A) used in lubricating a Caterpillar diesel engine operating under 1A conditions for 100 hours was subjected to an electrical field under conditions described above and the lubricant was cleaned up effectively of sludge without effecting the additives present therein. Pentane insolubles were reduced from 0.29% wt. to 0.03% wt. and benzene insolubles were reduced from 0.25% wt. to 0.03% wt. All residue was deposited as a sticky black paste on the positive plate while the negative plate remained clean.

When this experiment was repeated using a used lubricating oil composition similar to Example A except that a different dispersant polymer was used namely 2% copolymer of vinyl pyrrolidone-lauryl methacrylate M.W. 450,000 (modified Example A called Example X) and on examination of such an electrically treated lubricant showed that such a lubricant (Example X) resisted purification in that pentane insolubles were reduced only from 0.3% to 0.25%, benzene insolubles were reduced from 0.28% to 0.20% and the additive concentration was reduced approximately by over 50%. Also, when the concentration of the Example I copolymer in Example A was increased to 5.5% wt. (Example Y) electrical treatment of such a used lubricant was ineffective with respect to sludge removal and additive retention.

(2) A very heavily contaminated (7.6% wt. pentane insoluble and 3.81% wt. benzene insolubles) polymeric dispersant oil Example B obtained from an automotive engine operating under GM MS test conditions deposited large amounts of sludge on both plates when subjected to an electrical field as in (1). The appearance of both plates was the same, giving no indication of a preferential separation of the sludge components. The additives were not removed.

When the Example B composition was modified by increasing the concentration of the copolymer of Example I from 0.5% wt. to 5.5% wt. (Example XX), and such a used lubricant (Example XX) was tested under conditions described above and thereafter subjected to an electrical field, it resisted purification.

(3) A used Example A oil was taken from a 1952 Oldsmobile which had 1700 miles of urban driving since the last oil change. The oil was subjected to an electrical field as in (1) and all sludge was removed while the additives were not.

A 1700 mile use Example XX oil when subjected to an electrical field resulted in removal of both sludge and additives.

(4) Two used polymeric dispersant oils (Examples A and B) were treated in a Burks purifier, one from a diesel engine and one from an automotive engine. These samples were circulated through the Burks Purifier for about 2 minutes, resulting in several passes over the plates with ¼″ spacing and charged to 16,000 volts. Both the pentane and benzene insolubles were reduced markedly as shown below, but the additive concentration after treatment remained the same.

OIL CLEANING BY BURKS PURIFIER

| | Before Electrostatic Treatment, percent wt. | After Electrostatic Treatment, percent wt. |
|---|---|---|
| 1 used polymeric dispersant oil from diesel engine-pentane insolubles (Examples A and B) | 0.05 | 0.001 |
| 2 used polymeric dispersant oil from diesel engine-benzene insolubles (Examples A and B) | 0.04 | 0.004 |
| 3 used polymeric dispersant oil from automotive engine-pentane insolubles (Examples A and B) | 0.04 | 0.01 |
| 4 used polymeric dispersant oil from automotive engine-benzene insolubles (Examples A and B) | 0.35 | 0.003 |
| 5 used polymeric dispersant oil from diesel engine-pentane insolubles (Example X) | 0.05 | 0.04 |
| 6 used polymeric dispersant oil from diesel engine-benzene insolubles (Example X) | 0.05 | 0.045 |
| 7 used polymeric dispersant oil from automotive engine-pentane insolubles (Example X) | 0.04 | 0.03 |
| 8 used polymeric dispersant oil from automotive engine-benzene insolubles (Example X) | 0.04 | 0.03 |
| 9 used polymeric dispersant oil from diesel engine-pentane insolubles (Example XX) | 0.05 | 0.04 |
| 10 used polymeric dispersant oil from diesel engine-benzene insolubles (Example XX) | 0.05 | 0.045 |
| 11 used polymeric dispersant oil from automotive engine-pentane insolubles (Example XX) | 0.04 | 0.03 |
| 12 used polymeric dispersant oil from automotive engine-benzene insolubles (Example XX) | 0.04 | 0.03 |

(5) A flat-plate low-oil velocity electrostatic oil cleaner was installed in the lube oil circulating system of a one-cylinder Caterpillar diesel engine operating on the 1A procedure for 100 hours, using polymeric dispersant oil Example A. The precipitator had 1″ plate spacing with 2500 volts impressed. The engine was also operated in an identical manner without any type of oil filtration, and again with a conventional metal edge filter in the lube oil system. Analysis of the used oil shows that the electrostatic precipitator kept the oil remarkably clean.

100-HOUR CATERPILLAR 1A DIESEL ENGINE TESTS POLYMERIC DISPERSANT OIL

| | End-of-Test Used Oil Analysis | |
|---|---|---|
| | Pentane Insolubles, percent wt. | Benzene Insolubles, percent wt. |
| No filtration | 0.24 | 0.19 |
| Metal edge-type filter | 0.26 | 0.15 |
| Electrostatic precipitator | 0.05 | 0.03 |

I claim as my invention:

1. A process for removing sludge and contaminants from used mineral lubricating oil composition containing from 0.1% to 2% of an oil-soluble copolymer of vinylpyridine and a mixture of dissimilar $C_{14-18}$ alkyl methacrylate esters by subjecting the used mineral lubricating oil composition to an electrical field intensity of from 2500 to 15,000 volts per centimeter for from 10 to 24 hours and thereafter separating the purified mineral lubricating oil composition from the sludge and contaminants.

2. The process of claim 1 wherein the copolymer is a copolymer of 2-methyl-5-vinylpyridine and a mixture of lauryl methacrylate and stearyl methacrylate in the molecular weight range of from 100,000 to 200,000.

3. The process of claim 1 wherein the copolymer is a copolymer of 2-methyl-5-vinylpyridine and a mixture of methyl methacrylate, lauryl methacrylate, and stearyl methacrylate in the molecular weight range of from 400,000 to 800,000.

References Cited by the Examiner

UNITED STATES PATENTS 2,116,509　5/1938　Cotrell _____ 204—300
2,665,242　1/1954　Bates _____ 204—299
2,889,282　6/1959　Lorensen _____ 252—51.5

FOREIGN PATENTS 235,861　12/1925　Great Britain.

OTHER REFERENCES

Feinlieb: The Electrochemical Society, Preprint 88-6, "Electrodeposition of Vinyl Plastics," Oct. 8, 1945.

Fink et al.: The Electrochemical Society, "Deposition of Synthetic Resins," pages 325–326, volume 94, December 1948.

JOHN H. MACK, Primary Examiner.

JOHN R. SPECK, Examiner.

G. BATTIST, E. ZAGARELLA, Assistant Examiners.